United States Patent
Kim et al.

(10) Patent No.: US 11,312,638 B2
(45) Date of Patent: Apr. 26, 2022

(54) METHOD FOR SYNTHESIZING COPPER SULFIDE NANO POWDER USING PLASMA SYNTHESIS

(71) Applicant: KOLON GLOTECH, Inc., Seoul (KR)

(72) Inventors: Soo-Heon Kim, Seoul (KR); Jong-Hyun Hwang, Seoul (KR); Shin-Hyuck Kang, Gumi-si (KR)

(73) Assignee: KOLON GLOTECH, Inc., Seoul (KR)

( * ) Notice: Subject to any disclaimer, the term of this patent is extended or adjusted under 35 U.S.C. 154(b) by 145 days.

(21) Appl. No.: 16/799,401

(22) Filed: Feb. 24, 2020

(65) Prior Publication Data

US 2020/0290887 A1    Sep. 17, 2020

(30) Foreign Application Priority Data

Mar. 14, 2019 (KR) .................. 10-2019-0029292
Mar. 14, 2019 (KR) .................. 10-2019-0029305

(51) Int. Cl.
*C01G 3/12* (2006.01)
*C01G 3/02* (2006.01)
*B82Y 40/00* (2011.01)
*A01N 59/20* (2006.01)

(52) U.S. Cl.
CPC ............... *C01G 3/12* (2013.01); *A01N 59/20* (2013.01); *C01G 3/02* (2013.01); *B82Y 40/00* (2013.01); *C01P 2004/30* (2013.01); *C01P 2004/61* (2013.01); *C01P 2004/62* (2013.01); *C01P 2004/64* (2013.01)

(58) Field of Classification Search
CPC .. C01G 3/12; C01G 3/02; B82Y 40/00; C01P 2004/30; C01P 2004/61; C01P 2004/62; C01P 2004/64; C01P 2002/72; C01P 2004/03; C01P 2002/85
See application file for complete search history.

(56) References Cited

FOREIGN PATENT DOCUMENTS

| KR | 1020000070140 A | 11/2000 |
| KR | 1020110052729 A | 5/2011 |
| KR | 1020160021775 A | 2/2016 |
| KR | 1020180002925 A | 1/2018 |

OTHER PUBLICATIONS

Thimsen, Elijah, Uwe R. Kortshagen, and Eray S. Aydil. "Nonthermal plasma synthesis of metal sulfide nanocrystals from metalorganic vapor and elemental sulfur." Journal of Physics D: Applied Physics 48.31 (2015): 314004.*

Abdullaeva, Zhypargul, Emil Omurzak, and Tsutomu Mashimo. "Synthesis of copper sulfide nanoparticles by pulsed plasma in liquid method." World Acad. Int. Sch. Sci. Res. Innov 7 (2013): 422-425.*

Huang, Yu-Chun, et al. "Speciation of copper in plasma-melted slag." Journal of electron spectroscopy and related phenomena 156 (2007): 214-216.*

(Continued)

*Primary Examiner* — Richard M Rump

(57) ABSTRACT

Disclosed is a method for synthesizing copper sulfide nano powder using plasma synthesis. The method comprises providing a copper compound to a plasma apparatus, adding a sulfur, and performing a plasma process with respect to the copper compound and the sulfur for synthesizing a nano copper sulfide.

14 Claims, 13 Drawing Sheets

(56) References Cited

OTHER PUBLICATIONS

Ma, Rui, et al. "Sulfidation of copper oxide nanoparticles and properties of resulting copper sulfide." Environmental Science: Nano 1.4 (2014): 347-357.*

Zhao, Lu, et al. "Synthesis of highly dispersed metal sulfide catalysts via low temperature sulfidation in dielectric barrier discharge plasma." Green Chemistry 16.5 (2014): 2619-2626.*

"Properties of CuS thin films treated in air plasma", Y. Rodríguez-Lazcano, H. Martínez, M. Calixto-Rodríguez, A. Núñez Rodríguez. Thin Solid Films journal homepage: www.elsevier.com/locate/tsf. Available online Mar. 20, 2009.

"Surface structurization and control of CuS particle size by discharge mode of inductively coupled plasma and vapor-phase sulfurization", Daehan Choi, Tae-Wan Kim, Rauf Shahzad, Hyeji Park, H J Yeom, J H Kim, D J Seong, Sang-Woo Kang, Euijoon Yoon and Hyo-Chang Lee. Plasma Sources Sci. Technol. 27 (2018) 114002 (10pp). https://doi.org/10.1088/1361-6595/aae8f6. Published Nov. 7, 2018.

* cited by examiner

FIG. 2

| Classification | CuO | Cu(Nano) | CuO+S(10%) | CuO+S(20%) | CuO+S(30%) | CuO+S(40%) | CuO+S(50%) |
|---|---|---|---|---|---|---|---|
| Particle size | 75~52000 | 90~770 | 80~410 | 50~305 | 110~365 | 85~290 | 70~225 |

*Size distribution

*Content Analysis

METHOD FOR SYNTHESIZING COPPER SULFIDE NANO POWDER USING PLASMA SYNTHESIS

CROSS-REFERENCE TO RELATED APPLICATION

The present application claims priority under 35 U.S.C. 119(a) to Korean Patent Application No. 10-2019-0029292, filed on Mar. 14, 2019, and Korean Patent Application No. 10-2019-0029305, filed on Mar. 14, 2019. The entire disclosure of above patent applications is incorporated herein by reference.

TECHNICAL FIELD

The present disclosure relates to a method for synthesizing copper sulfide nano powder using plasma synthesis.

BACKGROUND ART

In order to prevent bacterial infections, hygienic articles have been used. Due to cost, cheap hygienic articles with organic antibacterial have been widely used. However, it is preferable to employ hygienic articles with inorganic antibacterial, which is harmless to human beings from the point of view of long-term toxicity. Inorganic biotics is excellent to suppress and extinct bacteria, and however, have not actively used. Inorganic additives such as Ag, CuO, ZnO, $TiO_2$ also perform as an antibacterial function, but they are very expensive and are susceptible to oxidation that they are ineffective to extinct strains such as molds or colon bacillus. Accordingly, there is a need for inorganic antibacterial with high efficiency at low cost.

In particularly, CuO has been applied as inorganic antibacterial, but copper is very susceptible to oxidation so that natural performance of copper becomes decreased to reduce antibiosis and sterilization. Also, copper compound is susceptible to moisture to be easily re-agglomerated with small amount of moisture. As a result, it is difficult to obtain copper compound particles with a predetermined particle size.

In order to minimize oxidation of copper, there has also been an attempt to employ CuS. CuS has been manufactured by a wet process but is expensive in comparison with CuO. Also, CuS being sold contains a large quantity of impurities including oxygen and has problems such as oxidation. In addition, the particle size is very un-uniform because it is ranged from nm to μm.

These synthesized CuS through a wet process as additives have high antibiosis and sterilization with small amount like 0.1 w % of CuS. However, due to high cost, it is difficult for CuS to be applied in various fields.

In the meanwhile, to obtain CuS with uniform particles and few impurities, a drying step is performed between a dry process and a wet process. For this reason, a process becomes increased to occur loss and run up production costs as well as consume time. Furthermore, despite of several processes, particle size is still ranged from nm to μm.

Accordingly, there is a need to develop a method for synthesizing CuS minimizing oxidation of CuS to maximize antibiosis and sterilization as inorganic antibacterial with high purity and uniform particle at low production cost.

SUMMARY OF THE INVENTION

It is therefore an object of the present disclosure to provide a method for synthesizing a copper sulfide nano powder using plasma synthesis comprising providing a copper compound to a plasma apparatus, adding a sulfur, and performing a plasma process with respect to the copper compound and the sulfur to synthesize a nano copper sulfide.

It is another object of the present disclosure to provide an antibacterial goods including the copper sulfide nano powder manufactured in accordance with the method for synthesizing a copper sulfide nano powder using plasma synthesis Embodiments of the present disclosure provide a method for synthesizing a copper sulfide nano powder using plasma synthesis comprising providing a copper compound to a plasma apparatus, adding a sulfur, and performing a plasma process with respect to the copper compound and the sulfur to synthesize a nano copper sulfide.

Pursuant to embodiments of the present disclosure, the copper compound is a copper oxide compound or a copper sulfide compound.

Pursuant to embodiments of the present disclosure, the copper compound is one or more selected from the group consisting of CuO, $Cu_2O$, CuS, and $CuS_2$.

Pursuant to embodiments of the present disclosure, the copper compound has a particle size ranged from 30 nm to 53,000 nm.

Pursuant to embodiments of the present disclosure, the sulfur of 5 weight % to 50 weight % is added with respect to the copper compound of 100 weight %.

Pursuant to embodiments of the present disclosure, the copper compound is provided at an injection speed of 1 to 5 kg/hr.

Pursuant to embodiments of the present disclosure, the sulfur is provided at a speed of 0.2 to 5 kg/hr.

Pursuant to embodiments of the present disclosure, the plasma processing is performed on condition that a plasma power is ranged from 10 to 50 kW, a pressure is ranged from 130 to 500 Torr, or a gas flow rate is ranging from 80 to 200 LPM.

Pursuant to embodiments of the present disclosure, the plasma processing is performed on condition that a plasma temperature is ranged from 5,000 to 10,000° C.

Pursuant to embodiments of the present disclosure, the synthesized copper sulfide nano powder is hexagonal-shaped.

Pursuant to embodiments of the present disclosure, the synthesized copper sulfide nano powder contains oxygen less than 5 weight %.

Pursuant to embodiments of the present disclosure, the synthesized copper sulfide nano powder has a particle size ranged from 50 nm to 900 nm.

Embodiments of the present disclosure provide an antibacterial goods including the copper sulfide nano powder manufactured by a method for synthesizing a copper sulfide nano powder using plasma synthesis The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the disclosure, and many of the attendant advantages thereof, will be readily apparent as the same becomes better understood by reference to the following detailed description when considered in conjunction with the accompanying drawings in which like reference symbols indicate the same or similar components, wherein

FIG. 2 shows particles of CuO+S after synthesizing CuO+S using plasma;

DETAILED DESCRIPTION

Figure 1:
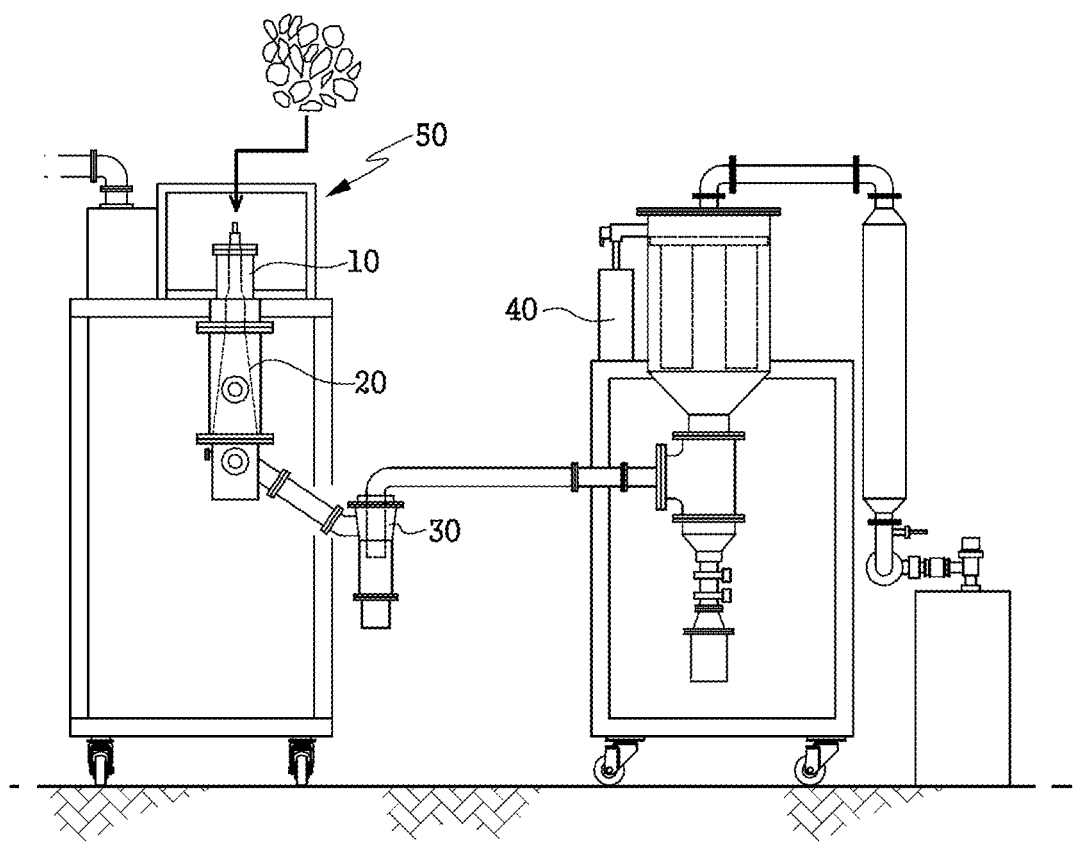
FIG. 1 shows a thermal plasma apparatus according to the present disclosure.
Figure 3:
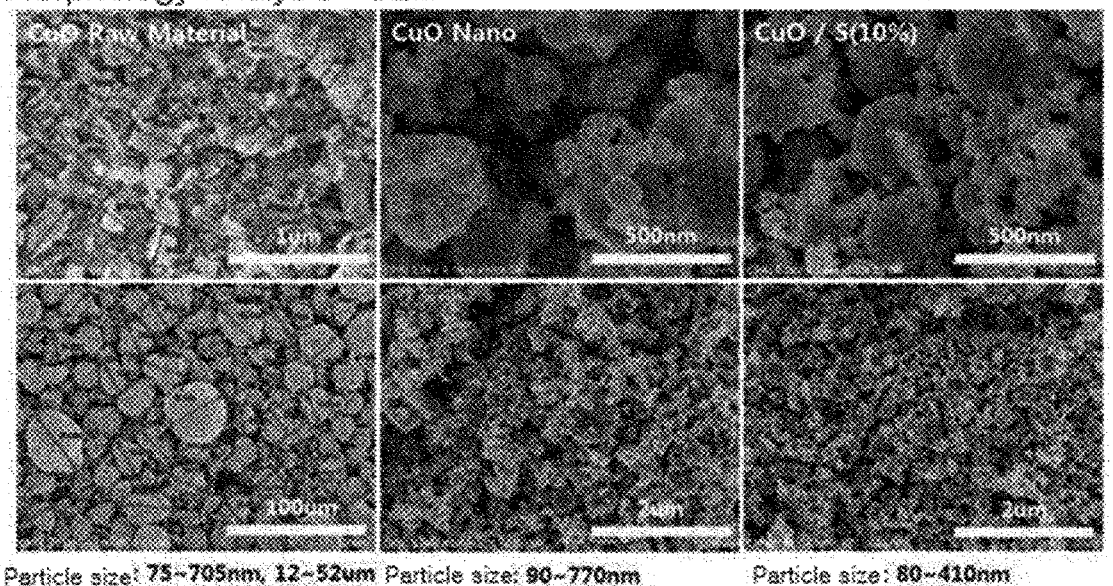
FIGS. 3 to 5 show an analysis result of morphology of CuO+S through SEM and a content analysis of CuO+S through EDS after synthesizing CuO+S using plasma.
Figure 4:
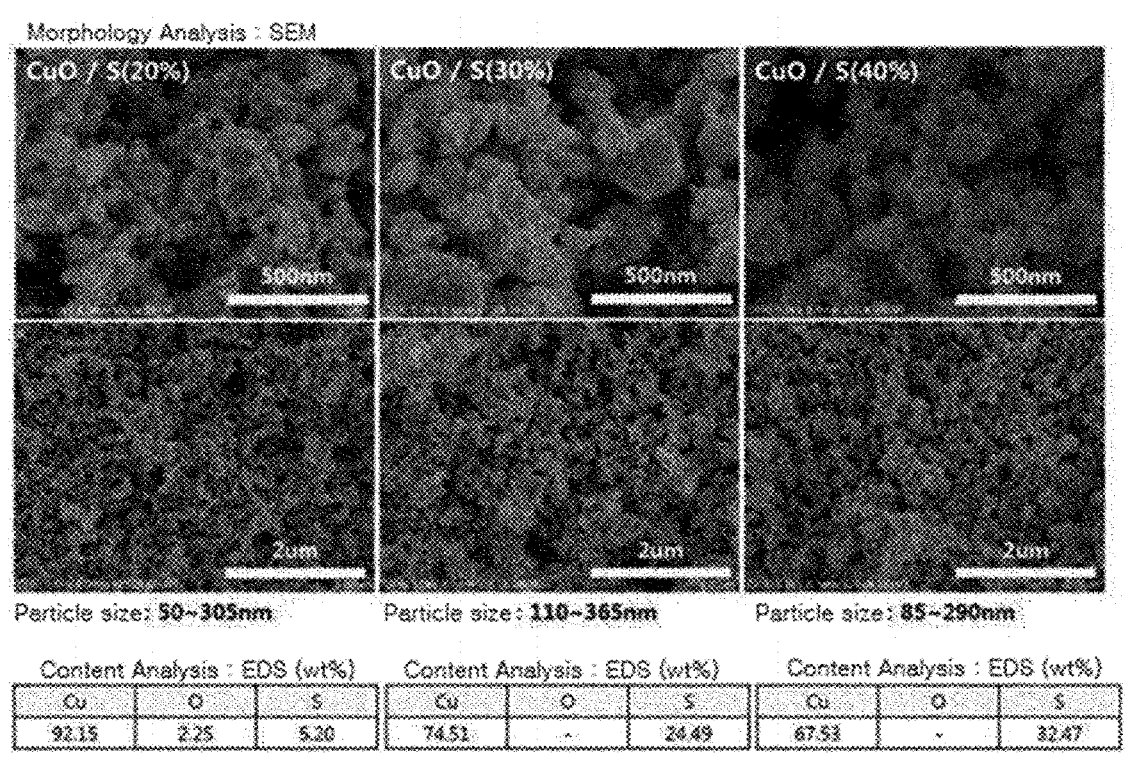
Figure 5:
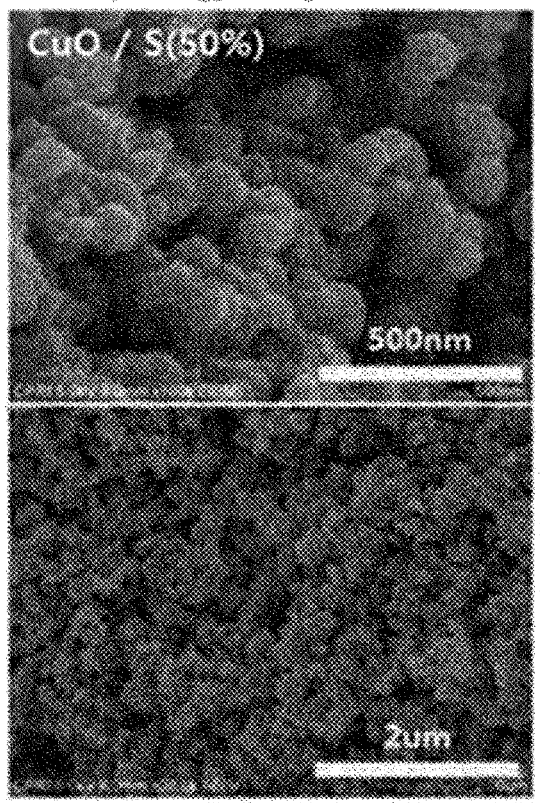

Hereinafter, the present disclosure will be described in detail with reference to the drawings. In describing the present disclosure, detailed descriptions related to publicly known functions or configurations will be omitted in order not to obscure the gist of the present disclosure.

The present disclosure may, however, be embodied in different forms and should not be construed as limited to the embodiments set forth herein.

Various modifications to the preferred embodiments will be readily apparent to those skilled in the art and the generic principles herein may be applied to other embodiments. Thus, the present disclosure is not limited to the embodiment shown but is to be accorded the widest scope consistent with the principles and features described herein.

The present disclosure may, however, be embodied in different forms and should not be construed as limited to the embodiments set forth herein. The same reference numeral is used to refer to like elements throughout.

In the specification, terms such as "include" or "have" should be understood as designating that features, number, steps, operations, elements, parts, or combinations thereof exist and not as precluding the existence of or the possibility of adding one or more other features, numbers, steps, operations, elements, parts, or combinations thereof in advance.

The terminology which is used in common will be used for the purpose of description and not of limitation. Furthermore, terms and words used by the applicant may be used for special cases. In this case, the meaning of terms or words must be understood with due regard to the meaning expressed in the specification rather than taking into account only the basic meaning of the terms and words.

Hereinafter, the technical construction of the present disclosure will be described in detail with reference to preferred embodiments illustrated in the attached drawings.

In an embodiment, the present disclosure provides a method for synthesizing a copper sulfide nano powder using plasma synthesis comprising, providing a copper compound to a plasma apparatus, adding a sulfur, and performing a plasma process with respect to the copper compound and the sulfur for synthesizing a nano copper sulfide.

The method for synthesizing the copper sulfide nano powder using plasma synthesis includes providing the copper compound to the plasma apparatus.

The plasma apparatus for synthesizing the copper sulfide nano powder is schematically shown in FIG. 1. Referring to FIG. 1, the plasma apparatus includes a plasma zone 10, electrodes 50, a reactor 20, a cyclone 30, and a collector 40. The copper sulfide nano powder of the present disclosure may be synthesized using the plasma apparatus of FIG. 1 or a publicly-known plasma apparatus.

In the present disclosure, the term such as "plasma" may be understood as a thermal plasma. During a thermal plasma method, precursor powders stay in a plasma zone (a plasma heating zone) to produce a nano-sized powder vapor. Then, the nano-sized powder vapor is in contact with an inert gas and becomes cooled to make and control a particle size. The plasma zone 10 has a high-temperature (heating) zone of thermal plasma therein by applying high frequency electric field to a coil. The inert gas may be argon, helium, and the like. The provided precursor powder becomes nano-sized by thermal plasma through the reactor 20. The cyclone 30 collects impurities, and the collector 40 collects the manufactured copper sulfide nano powder.

In the present disclosure, the copper compound provided to the plasma apparatus is a copper oxide compound or a copper sulfide compound. The copper sulfide compound is one or more selected from the group consisting of CuO, $Cu_2O$, CuS, and $CuS_2$. In addition, the copper compound has a particle size ranged from 30 nm to 53,000 nm.

In the present disclosure, the copper compound manufactured by a conventional wet process has un-uniform particle size such as particle size ranged from nm to µm. CuS is strained through a strainer to have a particle size ranged from 30 nm to 53,000 nm. This CuS is used as a raw compound for plasma synthesis.

In accordance with the present disclosure, the copper oxide compound provided to the plasma apparatus is CuO or $Cu_2O$, which has very un-uniform particle size. That is, the copper oxide compound having a particle size ranged from 75 nm to 52,000 nm exists in a spherical type or a board type. A copper oxide compound manufactured by a conventional wet process has very un-uniform particle size ranged from 75 nm to 52,000 nm, but in the present disclosure, the precursor compound for plasma synthesis is used to obtain uniform CuS.

If a particle size of a powder of the copper oxide compound is less than 75 nm, the flowability of the powder is decreased to be packed in the middle of providing it to the plasma zone 10. In this case, an input is decreased and a pipe for input is clogged to decrease productivity. Unlike this, if a particle size of a powder of the copper oxide compound exceeds 52,000 nm, the cooper oxide compound is not completely vaporized. Accordingly, it is important to select a raw material having proper particle size depending on a target particle size of copper sulfide nano powder. In order to obtain copper sulfide nano powder having a particle size ranged from 50 nm to 500 nm, a copper oxide having a particle size ranged from 75 nm to 52,000 nm is used.

In the present disclosure, the copper sulfide compound provided to the plasma apparatus is CuO or $Cu_2O$, which has a particle size ranged from 30 nm to 53,000 nm. The copper sulfide compound manufactured by a conventional wet process has un-uniform particle size such as particle size ranged from nm to µm. CuS is strained through a strainer to have a particle size ranged from 30 nm to 53,000 nm. This CuS is used as a raw compound for plasma synthesis.

If a particle size of a powder of the copper sulfide compound is less than 30 nm, the flowability of the powder is increased but rapidly vaporized due to low melting temperature in the middle of providing it to the plasma zone 10, thereby occurring nuclear growth on inner walls and an injection pipe. As a result, a supplying pipe is clogged to decrease productivity and increase loss rate. Unlike this, if a particle size of a powder of the copper sulfide compound exceeds 53,000 nm, the flowability of the powder is decreased to be packed in the middle of providing it to the plasma zone 10. In this case, an input is decreased and a pipe for input is clogged to decrease productivity. Furthermore, the cooper sulfide compound may not be vaporized. Accordingly, it is important to select a raw material having proper particle size depending on a target particle size of copper sulfide nano powder. In order to obtain copper sulfide nano powder having a particle size ranged from 50 nm to 900 nm, a copper oxide having a particle size ranged from 30 nm to 28,000 nm is used.

The copper oxide such as copper sulfide compound or copper oxide compound is injected at a flow rate ranged from 1 kg/hr to 5 kg/hr. Concretely, the copper compound is injected through a raw material supply to the plasma zone 10 of the plasma apparatus at a flow rate ranged from 1 kg/hr to 5 kg/hr. If the copper sulfide compound or the copper oxide compound is injected to at a flow rate less than 1 kg/hr, the amount of sulfur S of them is dramatically reduced, and due to the accumulated amount of sulfur S on walls of the reactor 20 or the cyclone 30, a collection rate is low in contradiction to an insert time. If the copper compound is injected at a rate exceeding 5 kg/hr, ionization is not sufficiently performed to create a non-proper synthesized powder or a powder with un-uniform particle size.

The present disclosure includes the adding the sulfur S.

In the present disclosure, the sulfur of 10 weight % to 50 weight % is added with respect to the copper oxide compound of 100 weight %. Concretely, a copper oxide compound is provided to the plasma zone 10 of the plasma apparatus. The sulfur is provided at an injection speed of 0.2 to 2.5 kg/hr. If the copper oxide compound is injected at an injection speed less than 0.2 kg/hr, there is a problem that sulfur S together with CuS is created. Similarly, if sulfur S less than 10 weight % with respect to the copper oxide compound of 100 weight % is injected, there is a problem that CuO together with CuS is created. Unlike this, if sulfur S exceeds 50 weight % with respect to the copper oxide compound of 100 weight % is injected, there is a problem that sulfur CuO together with CuS is created.

In addition, the sulfur S of 5 weight % to 30 weight % with respect to the copper sulfide compound of 100 weight %, is additionally injected. Concretely, the copper sulfide compound is injected to the plasma zone 10 of the plasma apparatus. In this case, the sulfur S is injected at an injection speed of 1 to 5 kg/hr. If the sulfur S is injected at an injection speed less than 1 kg/hr, the sulfur S is rapidly vaporized in comparison with the CuS compound, the sulfur is transformed into $SO_x$ and so forth rather than the combination of Cu and S, thereby occurring outgassing. If the sulfur S is injected at an injection speed exceeding 5 kg/hr, the content of sulfur S becomes increased so that targeting composition of CuS compound is different. As a result, there is a tendency for the ratio of sulfur S to be increased rather than Cu, and sulfur S has strong hygroscopicity to have strong absorption capacity with the CuS compound so that CuS becomes agglomerated with the sulfur S in an initial feeder to make a size of the powder to be bigger, thereby clogging an entrance of the feeder. Similarly, if the sulfur S less than 5 weight % with respect to the copper sulfide compound of 100 weight % is injected, the sulfur S is rapidly vaporized in comparison with the CuS compound, the sulfur is transformed into $SO_x$ and so forth rather than the combination of Cu and S, thereby occurring outgassing. If the sulfur S exceeding 30 weight % is injected, there is a tendency for the ratio of sulfur S to be increased rather than Cu, and sulfur S has strong hygroscopicity to have strong absorption capacity with the CuS compound so that CuS becomes agglomerated with the sulfur S in an initial feeder to make a size of the powder to be bigger, thereby clogging an entrance of the feeder.

The present disclosure includes the performing a plasma process with respect to the copper compound and the sulfur to synthesize a nano copper sulfide.

In this case, the copper compound is a copper oxide compound.

In the present disclosure, the plasma processing (copper compound plus sulfur) is performed on condition that a plasma power is ranged from 10 to 50 kW, a pressure is ranged from 150 to 500 Torr, or a gas flow rate is ranging from 100 to 200 LPM.

On condition that a plasma power was ranged from 10 to 50 kW, a pressure was 250 Torr, and a gas flow rate was 150 LPM (Liter Per Minute), a thermal plasma processing was performed to obtain a nano copper sulfide powder. If the plasma power is not ranged from 10 to 50 kW or is weak (less than 10 kW), due to insufficient vaporization, it is difficult to secure a wanted content and particle size. If the plasma power exceeds 50 kW, the nuclear growth of Cu occurs on an injection pipe and walls of a reactor by high plasma energy so that the injection pipe is fast clogged and Cu sticks to the walls of the reactor. For this reason, there are problems in that loss rate is increased, and sulfur S is not synthesized with Cu and becomes frequently outgassed. There are the same problems if a pressure is not ranged from 150 to 500 Torr. In other words, if a pressure is low, a vaporization rapidly occurs and a nuclear growth on the walls and outgassing happens frequently. If a pressure is high, it is difficult to generate a powder having uniform particle size due to insufficient vaporization. Gas flow rate not ranging from 100 to 200 LPM is correlation with a pressure. That is, if a gas flow rate is low, a pressure becomes low, and if a gas flow rate is high, a pressure becomes high.

In this case, the copper compound is a copper sulfide compound.

In the present disclosure, the plasma processing (copper sulfide compound plus sulfur) is performed on condition that a plasma power is ranged from 20 to 40 kW, a pressure is ranged from 130 to 230 Torr, or a gas flow rate is ranging from 80 to 180 LPM.

If the plasma power is not ranged from 20 to 40 kW or is weak (less than 20 kW), due to insufficient vaporization, it is difficult to secure a wanted content and particle size. If the plasma power exceeds 40 kW, the nuclear growth of Cu occurs on an injection pipe and walls of a reactor by high plasma energy so that the injection pipe is fast clogged and Cu sticks to the walls of the reactor. For this reason, there are problems in that loss rate is increased, and sulfur S is not synthesized with Cu and becomes frequently outgassed. There are the same problems if a pressure is not ranged from 130 to 230 Torr. In other words, if a pressure is low, a vaporization rapidly occurs and a nuclear growth on the walls and outgassing happens frequently. If a pressure is high, it is difficult to generate a powder having uniform particle size due to insufficient vaporization. Gas flow rate not ranging from 80 to 180 LPM is correlation with a pressure. That is, if a gas flow rate is low, a pressure becomes low, and if a gas flow rate is high, a pressure becomes high.

In the present disclosure, the plasma processing is performed on condition that a plasma temperature is ranged from 5,000° C. to 10,000° C.

The plasma temperature is higher than a melting temperature of a material to be synthesized, but the melting temperature depends on a synthesis type or contents of a material and affects a yield. Metal materials with low melting temperature stick to the injection pipe or the reactor to increase loss rate. Specifically, copper is flexible and has low melting temperature to be adhered to increase loss rate, and accordingly, it is preferable that the plasma temperature is ranged from 5,000 to 10,000° C.

In an embodiment of the present disclosure, a copper sulfide nano powder was synthesized using low-cost copper oxide manufactured through a conventional wet process.

CuO powder (see comparative embodiment 1) with a particle size ranging from 0.1 μm to 52 μm, in more concretely, 75 nm to 52,000 nm through a conventional wet process was injected through a raw material supply to a thermal plasma apparatus at an injection speed of 3 kg/hr. Then, sulfur S of 10 weight % to 50 weight % with respect to the CuO of 100 weight % was additionally injected at an injection speed ranging from 0.3 to 1.5 kg/hr to synthesize a copper sulfide nano powder.

Concretely, it was confirmed that in case that the copper sulfide nano powder was manufactured by adding sulfur S to CuO through plasma synthesis, it had uniform particle size of hexagonal shape. It was confirmed that the particle size of the copper sulfide nano powder becomes decreased in comparison with CuO (see comparative embodiment 1), and becomes small to be uniform as the content of sulfur S is increased. For example, when sulfur S of 10 weight %, 20 weight %, 30 weight %, 40 weight %, and 50 weight % were added respectively, the particle size of CuO were ranged from 80 nm to 410 nm, from 50 nm to 305 nm, from 110 nm to 365 nm, from 85 nm to 290 nm, and from 70 nm to 225 nm, respectively.

In addition, after analyzing the structure of the synthesized copper sulfide powder, $Cu_2S$, CuS, CuO, S, and Cu were detected by additional content of sulfur S. If sulfur more than 10 weight % or 20 weight % was added, it was confirmed that $Cu_2S$ was synthesized to be detected. In addition, if sulfur more than 30 weight %, CuS was synthesized to be detected, and if sulfur more than 50 weight %, sulfur S as well as CuS was detected. If sulfur ranged from 30 weight % to 40 weight % was added to raw CuO, a plenty of CuS can be obtained. As a result, it is confirmed that this method was effective. According to an embodiment of the present disclosure, CuS manufactured by adding to sulfur S to CuO through plasma synthesis has a purity of 100% without impurities and a uniform particle size.

In addition, after performing an antifungal test with respect to Cuo+S powder using plasma synthesis, it was confirmed that there were antimicrobial effects with respect to *Aspergillus niger, Penicillium funiculosum, Paecilomyces variotii, Gliocladium vixens, Chaetomium globosum*.

Accordingly, CuS is synthesized from CuO to solve a problem that CuO is susceptible to oxidation of copper. Also, instead of high priced CuS, CuS is synthesized from low priced CuO so that the performance of Cu is strengthened to improve antibiosis and sterilization.

In an embodiment of the present disclosure, the synthesized copper sulfide nano powder through plasma processing is hexagonal-shaped. The synthesized copper sulfide nano powder contains oxygen less than 5 weight % and has a purity of 100%.

In an embodiment of the present disclosure, it was confirmed that while raw CuO (see a comparative embodiment 1) manufactured by a conventional wet process was a plate-type shape and a spherical-type shape, the synthesized copper sulfide nano powder through plasma processing was hexagonal-shaped to have uniform particle size.

In an embodiment of the present disclosure, the synthesized copper sulfide nano powder had a particle size ranging from 50 nm to 500 nm. Concretely, when sulfur S of 10 weight %, 20 weight %, 30 weight %, 40 weight %, and 50 weight % were added respectively, the particle size of CuO were ranged from 80 nm to 410 nm, from 50 nm to 305 nm, from 110 nm to 365 nm, from 85 nm to 290 nm, and from 70 nm to 225 nm, respectively.

In other embodiment of the present disclosure, CuS powder (see comparative embodiment 3) with a particle size ranging from 30 nm to 28,000 nm through a conventional wet process was injected through a raw material supply to a thermal plasma apparatus at an injection speed of 3 kg/hr. Sulfur S ranging from 10 weight % to 20 weight % with respect to the CuS of 100 weight % was additionally injected at an injection speed of 0.3, 0.45, and 0.6 kg/hr under a plasma power of 30 kW, a pressure of 150 Torr, and a gas flow rate of 100 LPM through a thermal plasma process to synthesize a copper sulfide nano powder.

As a result, in comparison with a case that a sulfur was not added, it was confirmed that the particle size of the obtained copper sulfide nano powder was more uniform, and the contents of Cu and S were more similar to the raw CuS powder, which was before the thermal plasma process. As a result of XRD analysis, it was confirmed that the copper sulfide nano powder had a similar structure to the CuS raw powder (see comparative embodiment 3) through the conventional wet process as sulfur S was increasingly injected. In case that CuS was added with sulfur S and through plasma, CuS removing impurities and uniform particle size with hexagonal shape can be obtained in comparison with the CuS raw powder through the conventional wet process.

In addition, the copper sulfide nano powder was synthesized by injecting the copper sulfide compound at an injection speed ranging from 2.8 to 3.2 kg/hr and sulfur S at an injection speed ranging from 0.2 to 0.7 kg/hr through a plasma process, so that while CuS powder with a particle size ranging from 30 nm to 28,000 nm manufactured by the conventional wet process in the comparative embodiment 3 contained copper Cu (51.3), sulfur S (40.41), and oxygen O (8.29), the copper nano compound synthesized by adding sulfur through a plasma process only contained Cu and S removing impurities such as oxygen. Accordingly, it was possible to synthesize a copper compound having a purity of 100%, removing impurities, and having a uniform particle size. Also, the oxidation of copper was not processed because oxygen was not included so that the performance of Cu was strengthened to improve antibiosis and sterilization.

In an embodiment of the present disclosure, it was confirmed that CuS was added with sulfur S and through plasma, CuS removing impurities and uniform particle size with hexagonal shape can be obtained in comparison with the CuS raw powder through the conventional wet process.

In an embodiment of the present disclosure, a copper sulfide nano powder synthesized by injecting copper sulfide has a particle size ranging from 50 nm to 900 nm. Concretely, when sulfur S of 10 weight %, 15 weight %, and 20 weight % were added respectively, the particle size of CuS were ranged from 80 nm to 800 nm, from 70 nm to 360 nm, and from 50 nm to 300 nm, respectively.

Hereinafter, the present disclosure will now be described more fully with reference to some embodiments. The embodiments are only examples of the present disclosure, but is not limited to them.

In some embodiments of the present disclosure, Cu powder was synthesized by applying a thermal plasma process to CuO+S, and a CuS powder with high yield by applying a thermal plasma process to CuS+S.

A. Synthesizing CuS Using CuO

EXPERIMENTAL EXAMPLE 1

Performing Thermal Plasma Using CuO+S

In the experimental example, for replacing high-priced CuS, a nano copper sulfide powder was synthesized using low-priced CuO manufactured through a conventional wet process.

Comparative Embodiment 1

A CuO powder manufactured through a conventional wet process and having a particle size ranged from 75 nm to 52,000 nm itself was set as comparative embodiment 1, and raw products being copper oxide manufactured by NIHON KAGAKU SNAGYO Co., Ltd was used as it is.

Embodiments 1 to 5

A CuO powder (See comparative embodiment 1) manufactured through a conventional wet process and having a particle size ranged from 75 nm to 52,000 nm was injected through a raw material supply at an injection speed of 3 kg/hr, and sulfur S ranged from 10 weight % to 50 weight % with respect to CuO of 100 weight % was additionally injected at an injection speed from 0.3 to 1.5 kg/hr. On condition that plasma power was ranged from 10 to 50 kW, a pressure was 250 Torr, and a gas flow rate was 150 LPM, copper sulfide nano powder was obtained through a thermal plasma process.

Comparative Embodiment 2

A thermal plasma process was performed in the same manner as in Embodiments 1 to 5, except that sulfur was added to CuO powder (see comparative embodiment 1) with a particle size ranged from 75 nm to 52,000 nm manufactured through a conventional wet process.

TABLE 1

| Classification | Raw material amount (kg/hr) | | Power (kW) | Pressure (Torr) | Total gas (Gas Flow Rate) (LPM) |
|---|---|---|---|---|---|
| | CuO | S | | | |
| Embodiment 1 | 3 | 0.3 (10 W %) | 10~50 | 250 | 150 |
| Embodiment 2 | 3 | 0.6 (20 W %) | 10~50 | 250 | 150 |
| Embodiment 3 | 3 | 0.9 (30 W %) | 10~50 | 250 | 150 |
| Embodiment 4 | 3 | 1.2 (40 W %) | 10~50 | 250 | 150 |
| Embodiment 5 | 3 | 1.5 (50 W %) | 10~50 | 250 | 150 |
| Com. Embodiment 2 | 3 | — | 10~50 | 250 | 150 |

EXPERIMENTAL EXAMPLE 2

Analysis of Particle Size, Morphology, and Component of CuO+S Powder Through Plasma Synthesis The particle size, morphology, and component of CuS through plasma synthesis were analyzed by adding sulfur S to CuO ranging from 10 weight % to 50 weight % (see FIGS. 2 to 5). FIGS. 2 to 5 show an analysis result of morphology of CuO+S powder through SEM (Scanning Electron Microscope) and a content analysis of CuO+S powder through EDS (Energy-dispersive X-ray spectroscopy).

It was confirmed that while raw CuO (see comparative embodiment 1) was a plate-type shape and a spherical-type shape, the copper sulfide nano powder manufactured by adding sulfur S to CuO through plasma synthesis had uniform particle size of hexagonal shape. It was confirmed that the particle size (D10-D90) of the copper sulfide nano powder becomes decreased in comparison with CuO (see comparative embodiment 1), and become small to be uniform as the content of sulfur S is increased. In concretely, CuO powder (Raw) of the embodiment 1 without a plasma process had an average particle size ranging from 75 nm to 52,000 nm. CuO without sulfur through a plasma process of the embodiment 2 had an average particle size ranging from 90 nm to 770 nm. When sulfur S of 10 weight %, 20 weight %, 30 weight %, 40 weight %, and 50 weight % were added respectively, the particle size of CuO were ranged from 80 nm to 410 nm, from 50 nm to 305 nm, from 110 nm to 365 nm, from 85 nm to 290 nm, and from 70 nm to 225 nm, respectively. Accordingly, there was a tendency that as sulfur was increased, the particle size (D10-D90) of CuO was decreased.

In addition, in the CuO powder (Raw) of the comparative embodiment 1, the contents of Cu and O were 78.96 weight % and 21.04 weight %, respectively. In the CuO powder (Raw) of the comparative embodiment 2, the content of Cu become increased as 90.14 weight %, and the content of O become decreased as 9.86 weight %.

When sulfur of 10 weight % was added, the contents of Cu, O, and S were 90.25 weight %, 7.45 weight %, and 2.3 weight %, in the embodiment 1, respectively. However, sulfur of 20 weight % was added, the contents of Cu, O, and S were 91.25 weight %, 2.25 weight %, and 5.20 weight %, in the embodiment 2, respectively. Sulfur of 30 weight % was added, the contents of Cu and S were 74.51 weight % and 24.49 weight %, respectively, and O was disappeared, in the embodiment 3. In addition, sulfur of 40 weight % was added, the contents of Cu and S were 67.53 weight % and 32.47 weight %, respectively, and O was disappeared, in the embodiment 4. Sulfur of 50 weight % was added, the contents of Cu and S were 59.48 weight % and 40.52 weight %, respectively, and O was disappeared, in the embodiment 5. In other words, it was confirmed that as sulfur was increased, CuS become increased.

EXPERIMENTAL EXAMPLE 3

Analysis of Structure of CuO+S Powder Through Plasma Synthesis

Figure 6:
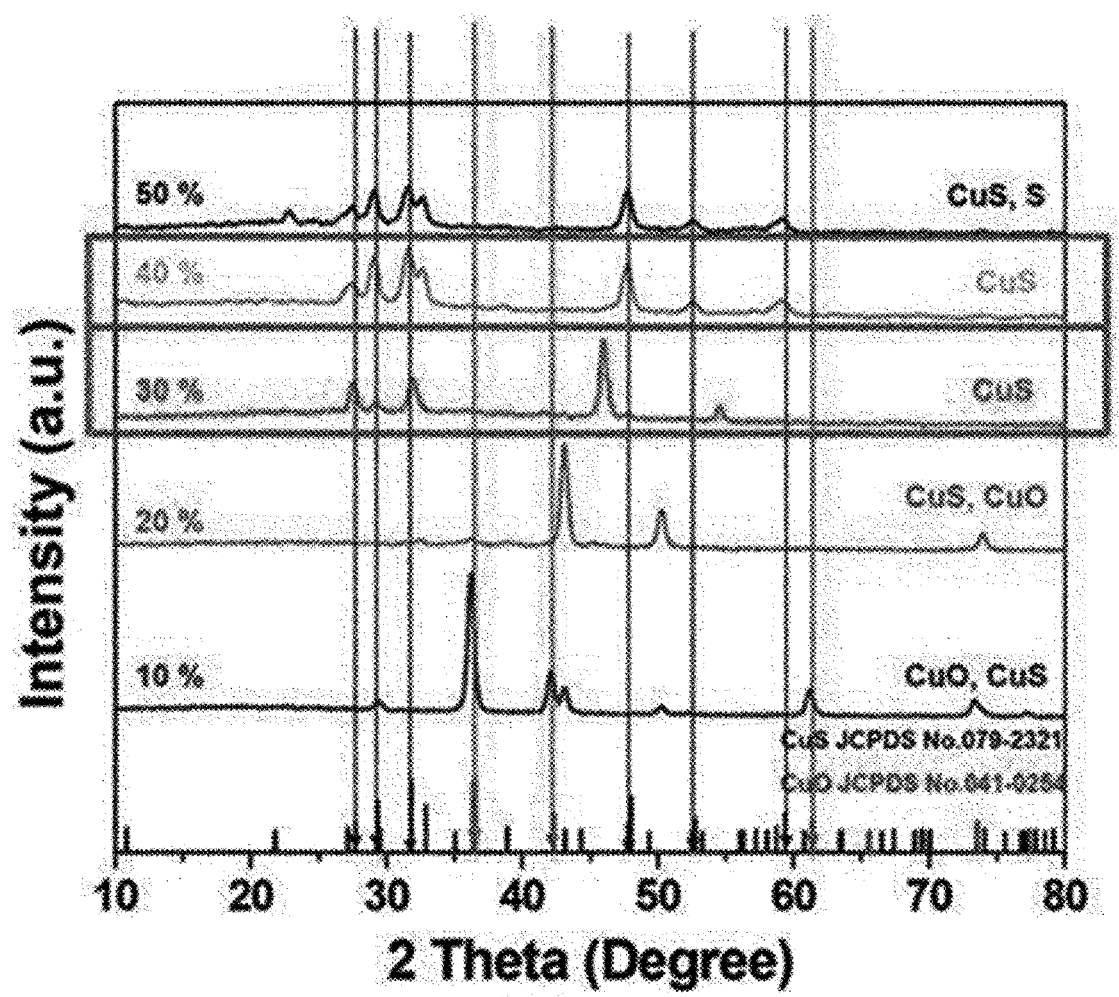
FIG. 6 shows a structure analysis result of CuO+S through XRD after synthesizing CuO+S using plasma.

Next, the component of copper sulfide nano powder through plasma synthesis by adding sulfur to raw CuO (see comparative embodiment 1) was analyzed. FIG. 6 shows a structure analysis result of CuO+S through XRD (X-Ray Diffraction) after synthesizing CuO+S using plasma. The components will be shown in Table 2. By synthesized contents, $Cu_2S$, CuS, CuO, $Cu_2S$ and $CuS_2$, and if sulfur more than 10 weight % or 20 weight % was added, it was confirmed that $Cu_2S$ was synthesized to be detected. In addition, if sulfur more than 30 weight % was added, CuS was synthesized to be detected, and if sulfur of 50 weight % was added, sulfur as well as CuS was detected. Accordingly, it was confirmed that it was effective to synthesize CuS in that sulfur ranging from 30 weight % to 40 weight % was added to raw CuO, thereby obtaining much of CuS.

of embodiment 4. Table 3 shows a test report of an antifungal test performed by the trusted third party with respect to Cuo+S powder using plasma synthesis. The test microorganism were five species such as *Aspergillus niger, Penicillium funiculosum, Paecilomyces variotii, Gliocladium virens*, and *Chaetomium globosum*. Results were deciphered by rating ranged from 0 to 5. Where, 0 means that fungus growth is not observed by a microscope and represents highest grade.

As a result, it was confirmed that the copper sulfide nano powder using plasma synthesis had antimicrobial effects with respect to *Aspergillus niger, Penicillium funiculosum, Paecilomyces variotii, Gliocladium virens, Chaetomium globosum*. In addition, there was the same antimicrobial effects in the embodiments 1, 2, 3, and 5, and the comparative embodiment 1 as the embodiment 4.

Accordingly, instead of high prices CuS, the copper sulfide nano powder using plasma synthesis manufactured by adding sulfur to CuO could be used as an additive for having antibiosis and sterilization.

TABLE 2

| Component | Comparative Embodiment 1 CuO Raw | Comparative Embodiment 2 CuO Nano | Embodiment 1 CuO/S (10%) | Embodiment 2 CuO/S (20%) | Embodiment 3 CuO/S (30%) | Embodiment 4 CuO/S (40%) | Embodiment 5 CuO/S (50%) |
|---|---|---|---|---|---|---|---|
| CuO(%) | 100.0 | 89.7 | | | | | |
| $Cu_2O$(%) | | 9.3 | 81.3 | 3.6 | | | |
| Cu(%) | | 1.0 | 15.4 | 87.1 | | | |
| $Cu_2S$(%) | | | 3.3 | 9.3 | 4.1 | 0.2 | |
| $Cu_9S_5$(%) | | | | | | | |
| CuS(%) | | | | | 95.9 | 99.8 | 72.2 |
| S(%) | | | | | | | 27.8 |

EXPERIMENTAL EXAMPLE 4

Photograph of CuO+S Powder Through Plasma Synthesis

Figure 7:
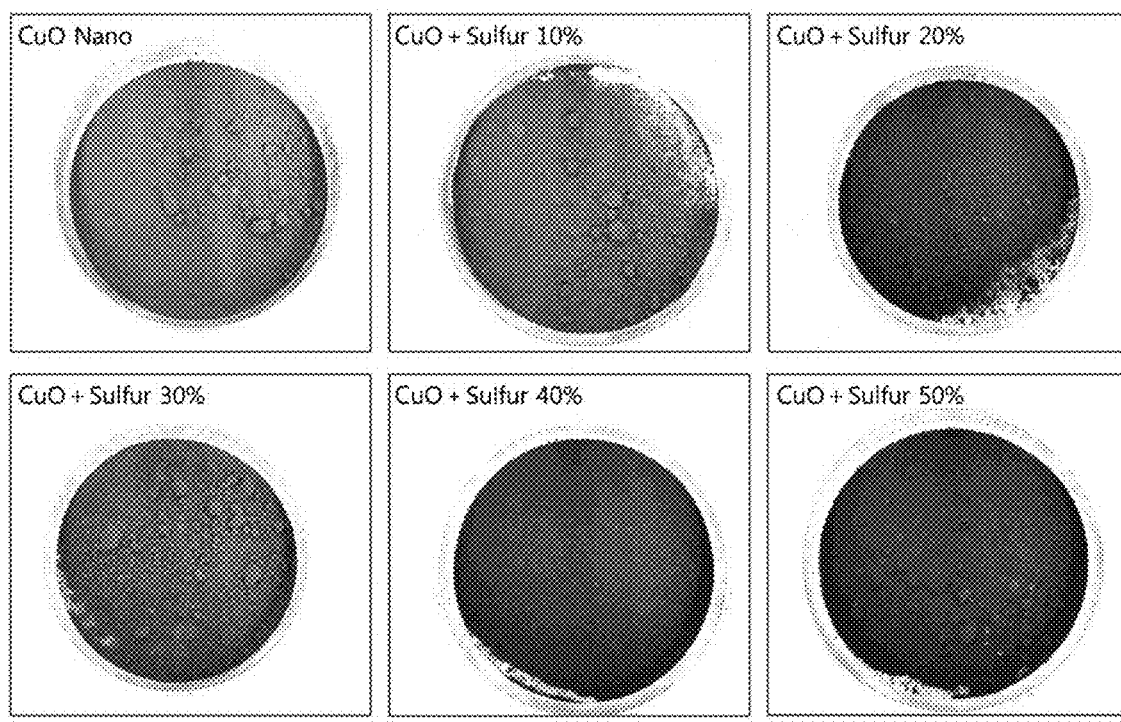
FIG. 7 is a test report of an antifungal test performed by the trusted third party with respect to CuO+S powder using plasma synthesis.

Next, copper sulfide nano powder using plasma synthesis by adding sulfur S to raw CuO (see comparative embodiment 1) was observed with the naked eyes. FIG. 7 shows photographs of the copper sulfide nano powder using plasma synthesis according to table 1. As the content of sulfur becomes increased, the color of preexisting copper was gradually changed to bluish green. As a result, it was confirmed that the color of synthesized copper sulfide powder become gradually dark.

EXPERIMENTAL EXAMPLE 5

Antifungal Test Result of Cuo+S Powder Using Plasma Synthesis

Then, an antifungal test was performed with respect to copper sulfide nano powder using plasma synthesis by adding sulfur S to raw CuO (see comparative embodiment 1)

TABLE 3

| Test item | Unit | Classification | Result | Test Method |
|---|---|---|---|---|
| Antifungal Test (After 1 week) | Rating | — | 0 | ISO846: 1997 (Method A) |
| Antifungal Test (After 2 weeks) | Rating | — | 0 | ISO846: 1997 (Method A) |
| Antifungal Test (After 3 weeks) | Rating | — | 0 | ISO846: 1997 (Method A) |
| Antifungal Test (After 4 weeks) | Rating | — | 0 | ISO846: 1997 (Method A) |

EXPERIMENTAL EXAMPLE 6

Comparing Yield of Copper Sulfide Nano Powder Using Plasma Synthesis

The amount and yield of copper sulfide nano powder using plasma synthesis manufactured by adding sulfur to CuO powder having a particle size ranged from 75 nm to 52,000 nm (see comparative embodiment 1) manufactured through a conventional wet process are comparatively in the following table 4.

TABLE 4

|  | Amount of CuO (kg/hr) | Amount of S (kg/hr) | Obtaining amount of CuS | CuS yield in comparison with input amount (%) |
|---|---|---|---|---|
| Embodiment 1 | 3 | 0.3 (10 weight %) | Cu(90.25) S(2.3) O(7.45) | 11% |
| Embodiment 2 | 3 | 0.6 (20 weight %) | Cu(92.15) S(5.20) O(2.25) | 13% |
| Embodiment 3 | 3 | 0.9 (30 weight %) | Cu(74.51) S(24.49) | 18% |
| Embodiment 4 | 3 | 1.2 (40 weight %) | Cu(67.53) S(32.47) | 35% |
| Embodiment 5 | 3 | 1.5 (50 weight %) | Cu(59.48) S(40.52) | 48% |

B. Synthesizing CuS Using CuS

EXPERIMENTAL EXAMPLE 7

Establishing Thermal Plasma Nano-Sized Process Condition

By applying various plasma process conditions such as raw material amount, power, pressure, and gas flow rate, copper sulfide powder was manufactured according to the following embodiments and comparative embodiments in order to establish optimal nano-sized plasma process suitable for manufacturing copper sulfide nano powder.

Comparative Embodiment 3

CuS powder having a particle size ranged from 30 nm to 28,000 nm through a conventional wet process itself was set as embodiment 3, and a raw product being copper sulfide by shanghai Co., Ltd was used as it is. The CuS powder through a conventional wet process had un-uniform particle size ranging from several nm to several μm, and accordingly, it was filtered out through a filter to have a particle size of average 53 μm. In the present disclosure, CuS powder with a particle size ranged from 30 nm to 28,000 nm through a strainer with 500 mesh was employed.

Comparative Embodiment 4 (4.1~4.5)

CuS powder (see comparative embodiment 3) with a particle size ranged from 30 nm to 28,000 nm through a conventional wet process was injected to a raw material supply at an injection speed ranged from 1 kg/hr to 5 kg/hr. On condition that plasma power was 20 kW, a pressure was 150 Torr, and a gas flow rate was 135 LPM, copper sulfide nano powder of the comparative embodiments 4.1~4.5 was obtained through a thermal plasma process.

TABLE 5

| Classification | Raw material amount (kg/hr) | Power (kW) | Pressure (Torr) | Total gas (Gas Flow Rate) (LPM) |
|---|---|---|---|---|
| Com. Embodiment 4.1 | 1 | 20 | 150 | 135 |
| Com. Embodiment 4.2 | 2 | 20 | 150 | 135 |
| Com. Embodiment 4.3 (#1) | 3 | 20 | 150 | 135 |
| Com. Embodiment 4.4 | 4 | 20 | 150 | 135 |
| Com. Embodiment 4.5 | 5 | 20 | 150 | 135 |

Comparative Embodiment 5 (5.1~5.5)

CuS powder (see comparative embodiment 3) with a particle size ranged from 30 nm to 28,000 nm through a conventional wet process was injected to a raw material supply at an injection speed ranged from 1 kg/hr to 5 kg/hr. On condition that plasma power was 40 kW, a pressure was 200 Torr, and a gas flow rate was 118 LPM, copper sulfide nano powder of the comparative embodiments 5.1~5.5 was obtained through a thermal plasma process.

TABLE 6

| Classification | Raw material amount (kg/hr) | Power (kW) | Pressure (Torr) | Total gas (Gas Flow Rate) (LPM) |
|---|---|---|---|---|
| Com. Embodiment 5.1 | 1 | 40 | 200 | 118 |
| Com. Embodiment 5.2 | 2 | 40 | 200 | 118 |
| Com. Embodiment 5.3 (#2) | 3 | 40 | 200 | 118 |
| Com. Embodiment 5.4 | 4 | 40 | 200 | 118 |
| Com. Embodiment 5.5 | 5 | 40 | 200 | 118 |

Comparative Embodiment 6 (6.1~6.5)

CuS powder (see comparative embodiment 3) with a particle size ranged from 30 nm to 28,000 nm through a conventional wet process was injected to a raw material supply at an injection speed ranged from 1 kg/hr to 5 kg/hr. On condition that plasma power was 60 kW, a pressure was 300 Torr, and a gas flow rate was 98 LPM, copper sulfide nano powder of the comparative embodiments 6.1~6.5 was obtained through a thermal plasma process.

TABLE 7

| Classification | Raw material amount (kg/hr) | Power (kW) | Pressure (Torr) | Total gas (Gas Flow Rate) (LPM) |
|---|---|---|---|---|
| Com. Embodiment 6.1 | 1 | 60 | 300 | 98 |
| Com. Embodiment 6.2 | 2 | 60 | 300 | 98 |
| Com. Embodiment 6.3 (#3) | 3 | 60 | 300 | 98 |

TABLE 7-continued

| Classification | Raw material amount (kg/hr) | Power (kW) | Pressure (Torr) | Total gas (Gas Flow Rate) (LPM) |
|---|---|---|---|---|
| Com. Embodiment 6.4 | 4 | 60 | 300 | 98 |
| Com. Embodiment 6.5 | 5 | 60 | 300 | 98 |

Comparative Embodiment 7 (7.1~7.5)

CuS powder (see comparative embodiment 3) with a particle size ranged from 30 nm to 28,000 nm through a conventional wet process was injected to a raw material supply at an injection speed ranged from 1 kg/hr to 5 kg/hr. On condition that plasma power was 80 kW, a pressure was 400 Torr, and a gas flow rate was 78 LPM, copper sulfide nano powder of the comparative embodiments 7.1~7.5 was obtained through a thermal plasma process.

TABLE 8

| Classification | Raw material amount (kg/hr) | Power (kW) | Pressure (Torr) | Total gas (Gas Flow Rate) (LPM) |
|---|---|---|---|---|
| Com. Embodiment 7.1 | 1 | 80 | 400 | 78 |
| Com. Embodiment 7.2 | 2 | 80 | 400 | 78 |
| Com. Embodiment 7.3 (#4) | 3 | 80 | 400 | 78 |
| Com. Embodiment 7.4 | 4 | 80 | 400 | 78 |
| Com. Embodiment 7.5 | 5 | 80 | 400 | 78 |

Comparative Embodiment 8 (8.1~8.5)

CuS powder (see comparative embodiment 3) with a particle size ranged from 30 nm to 28,000 nm through a conventional wet process was injected to a raw material supply at an injection speed ranged from 1 kg/hr to 5 kg/hr. On condition that plasma power was 100 kW, a pressure was 500 Torr, and a gas flow rate was 200 LPM, copper sulfide nano powder of the comparative embodiments 8.1~8.5 was obtained through a thermal plasma process.

TABLE 9

| Classification | Raw material amount (kg/hr) | Power (kW) | Pressure (Torr) | Total gas (Gas Flow Rate) (LPM) |
|---|---|---|---|---|
| Com. Embodiment 8.1 | 1 | 100 | 500 | 200 |
| Com. Embodiment 8.2 | 2 | 100 | 500 | 200 |
| Com. Embodiment 8.3 (#5) | 3 | 100 | 500 | 200 |
| Com. Embodiment 8.4 | 4 | 100 | 500 | 200 |
| Com. Embodiment 8.5 | 5 | 100 | 500 | 200 |

Embodiment 6

A CuS powder (See comparative embodiment 3) manufactured through a conventional wet process and having a particle size ranged from 30 nm to 28,000 nm was injected to a thermal plasma apparatus through a raw material supply at an injection speed of 3 kg/hr, and sulfur S of 10 weight % with respect to CuS of 100 weight % was additionally injected at an injection speed of 0.3 kg/hr. On condition that plasma power was ranged from 10 to 30 kW, a pressure was 150 Torr, and a gas flow rate was 100 LPM, copper sulfide nano powder of embodiment 6 was obtained through a thermal plasma process.

Embodiment 7

A CuS powder (See comparative embodiment 3) manufactured through a conventional wet process and having a particle size ranged from 30 nm to 28,000 nm was injected through a raw material supply at an injection speed of 3 kg/hr, and sulfur S of 10 weight % with respect to CuS of 100 weight % was additionally injected at an injection speed from 0.3 kg/hr. On condition that plasma power was ranged from 10 to 35 kW, a pressure was 200 Torr, and a gas flow rate was 157 LPM, copper sulfide nano powder of embodiment 7 was obtained through a thermal plasma process.

TABLE 10

| Classification | Raw material amount (kg/hr) CuO | S | Power (kW) | Pressure (Torr) | Total gas (Gas Flow Rate) (LPM) |
|---|---|---|---|---|---|
| Embodiment 6 (#6) | 3 | 0.3 (10 W %) | 30 | 150 | 100 |
| Embodiment 6 (#6') | 3 | 0.6 (20 W %) | 35 | 200 | 157 |

EXPERIMENTAL EXAMPLE 8

Analysis of Particle Size and Content According to Thermal Plasma Nano-Sized Process Condition Through the above comparative embodiments and embodiments, the particle size and content were analyzed through a thermal plasma nano-sized process. The size distribution of CuS powder manufactured according to a plasma nano-sized process condition including a pressure, a gas flow, RF power, and so forth was confirmed by XRD, and the modified amount thereof was confirmed by EDX (see FIG. 8). As a result, the distribution of the particle size was different by a process condition, and in order to check a process condition having similar contents of Cu and S as CuS through a conventional wet process, the content of CuS was analyzed by a process condition through EDS.

Figure 8:
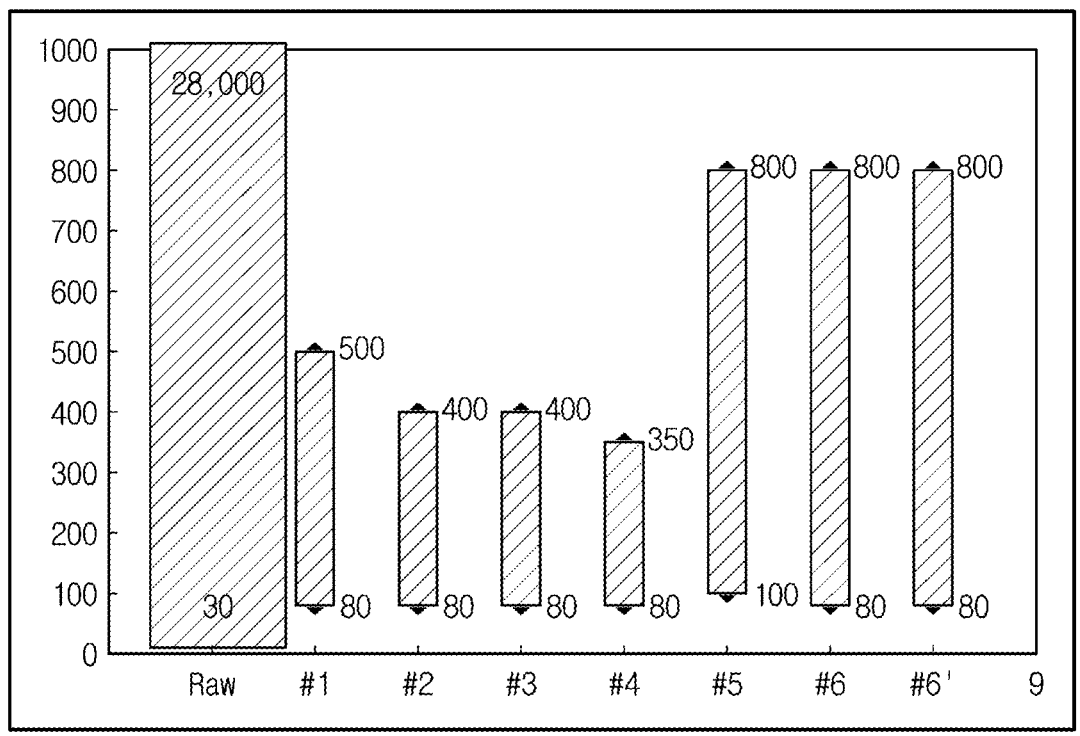
FIG. 8 show an analysis result of size and content of CuS after plasma nano-sized process with respect to CuS.
Figure 8:
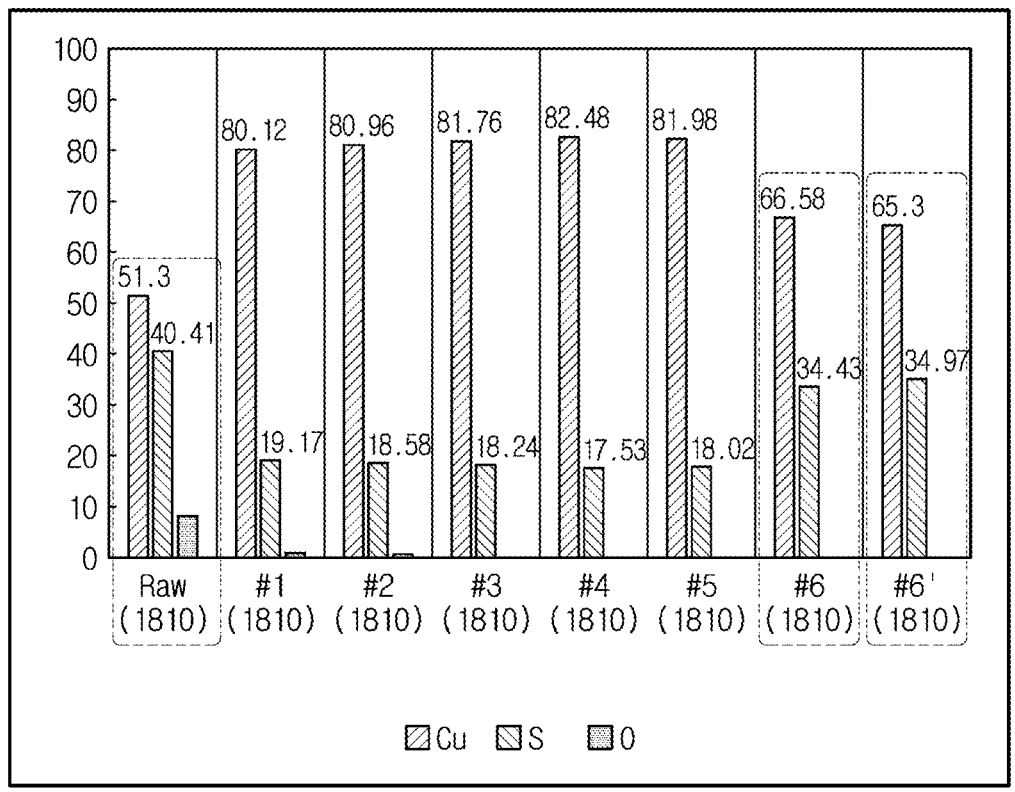

As a result, in comparison with CuS powder (Raw) in the comparative embodiment 3, the particle size of CuS through a thermal plasma process of the comparative embodiment 4.3 (#1) become decreased from 80 nm to 500 nm to be uniformly distributed. In addition, comparing CuS powder (Raw) of the comparative embodiment 3, the content of Cu become increased to 80.12 weight %, and the content of S become decreased to 19.17 weight %. Resultant, the contents of Cu and S were different before/after a plasma process. Also, comparing CuS powder (Raw) of the comparative embodiment 3, a large portion of O was removed so that it was confirmed that impurities were removed through a plasma process. FIG. 8 shows a result of only the comparative embodiment 4.3 (#1), but the particle size of CuS of the comparative embodiments 4.1, 4.2, 4.4, and 4.5 was also decreased, and the content of Cu become increased, and the content of S become decreased.

In addition, in comparison with CuS powder (Raw) in the comparative embodiment 3, the particle size of CuS through a thermal plasma process of the comparative embodiment 5.3 (#2) become decreased from 80 nm to 400 nm to be uniformly distributed. However, comparing CuS powder (Raw) of the comparative embodiment 3, the content of Cu become increased to 80.96 weight %, and the content of S become decreased to 18.58 weight %. Resultant, the contents of Cu and S were different before/after a plasma process. Also, comparing CuS powder (Raw) of the comparative embodiment 3, a large portion of O was removed so that it was confirmed that impurities were removed through a plasma process. FIG. 8 shows a result of only the comparative embodiment 5.3 (#2), but the particle size of CuS of the comparative embodiments 5.1, 5.2, 5.4, and 5.5 was also decreased, and the content of Cu become increased, and the content of S become decreased.

In addition, in comparison with CuS powder (Raw) in the comparative embodiment 3, the particle size of CuS through a thermal plasma process of the comparative embodiment 6.3 (#3) become decreased from 80 nm to 400 nm to be uniformly distributed. However, comparing CuS powder (Raw) of the comparative embodiment 3, the content of Cu become increased to 81.76 weight %, and the content of S become decreased to 18.24 weight %. Resultant, the contents of Cu and S were different before/after a plasma process. Also, comparing CuS powder (Raw) of the comparative embodiment 3, O was completely removed so that it was confirmed that impurities were removed through a plasma process. FIG. 8 shows a result of only the comparative embodiment 6.3 (#3), but the particle size of CuS of the comparative embodiments 6.1, 6.2, 6.4, and 6.5 was also decreased, and the content of Cu become increased, and the content of S become decreased.

In addition, in comparison with CuS powder (Raw) in the comparative embodiment 3, the particle size of CuS through a thermal plasma process of the comparative embodiment 7.3 (#4) become decreased from 80 nm to 350 nm to be uniformly distributed. However, comparing CuS powder (Raw) of the comparative embodiment 3, the content of Cu become increased to 82.48 weight %, and the content of S become decreased to 17.53 weight %. Resultant, the contents of Cu and S were different before/after a plasma process. Also, comparing CuS powder (Raw) of the comparative embodiment 3, O was completely removed so that it was confirmed that impurities were removed through a plasma process. FIG. 8 shows a result of only the comparative embodiment 7.3 (#4), but the particle size of CuS of the comparative embodiments 7.1, 7.2, 7.4, and 7.5 was also decreased, and the content of Cu become increased, and the content of S become decreased.

In addition, in comparison with CuS powder (Raw) in the comparative embodiment 3, the particle size of CuS through a thermal plasma process of the comparative embodiment 8.3 (#5) become decreased from 100 nm to 800 nm to be uniformly distributed. However, comparing CuS powder (Raw) of the comparative embodiment 3, the content of Cu become increased to 81.98 weight %, and the content of S become decreased to 18.02 weight %. Resultantly, the contents of Cu and S were different before/after a plasma process. Also, comparing CuS powder (Raw) of the comparative embodiment 3, O was completely removed so that it was confirmed that impurities were removed through a plasma process. FIG. 8 shows a result of only the comparative embodiment 8.3 (#5), but the particle size of CuS of the comparative embodiments 8.1, 8.2, 8.4, and 8.5 was also decreased, and the content of Cu become increased, and the content of S become decreased.

In addition, when sulfur of 10 weight % was added, the particle size of CuS through a thermal plasma process of the embodiments 6 (#6) and 7 (#6') become decreased from 80 nm to 800 nm to be uniformly distributed. The content of Cu was 66.58 weight %, and the content of S was 33.43 weight % in the embodiments 6 (#6). The content of Cu was 65.03 weight %, and the content of S was 34.97 weight % in the embodiments 7 (#6'). Comparing CuS (Raw) powder of the comparative embodiment 3, the particle size of CuS become decreased, and the contents of Cu and S were very similar to the CuS (Raw) powder through a conventional wet process of the comparative embodiment 3, and it was confirmed that O was completely removed through a plasma process to remove impurities.

Accordingly, after adding sulfur of 10 weight % of the embodiments 6 and 7 to CuS powder (Raw) through a conventional wet process (Raw) of the comparative embodiment 3 and then a plasma process was performed, so that copper sulfide nano powder without impurities having similar contents of Cu and S before/after the plasma process could be obtained.

EXPERIMENTAL EXAMPLE 9

Figure 9:
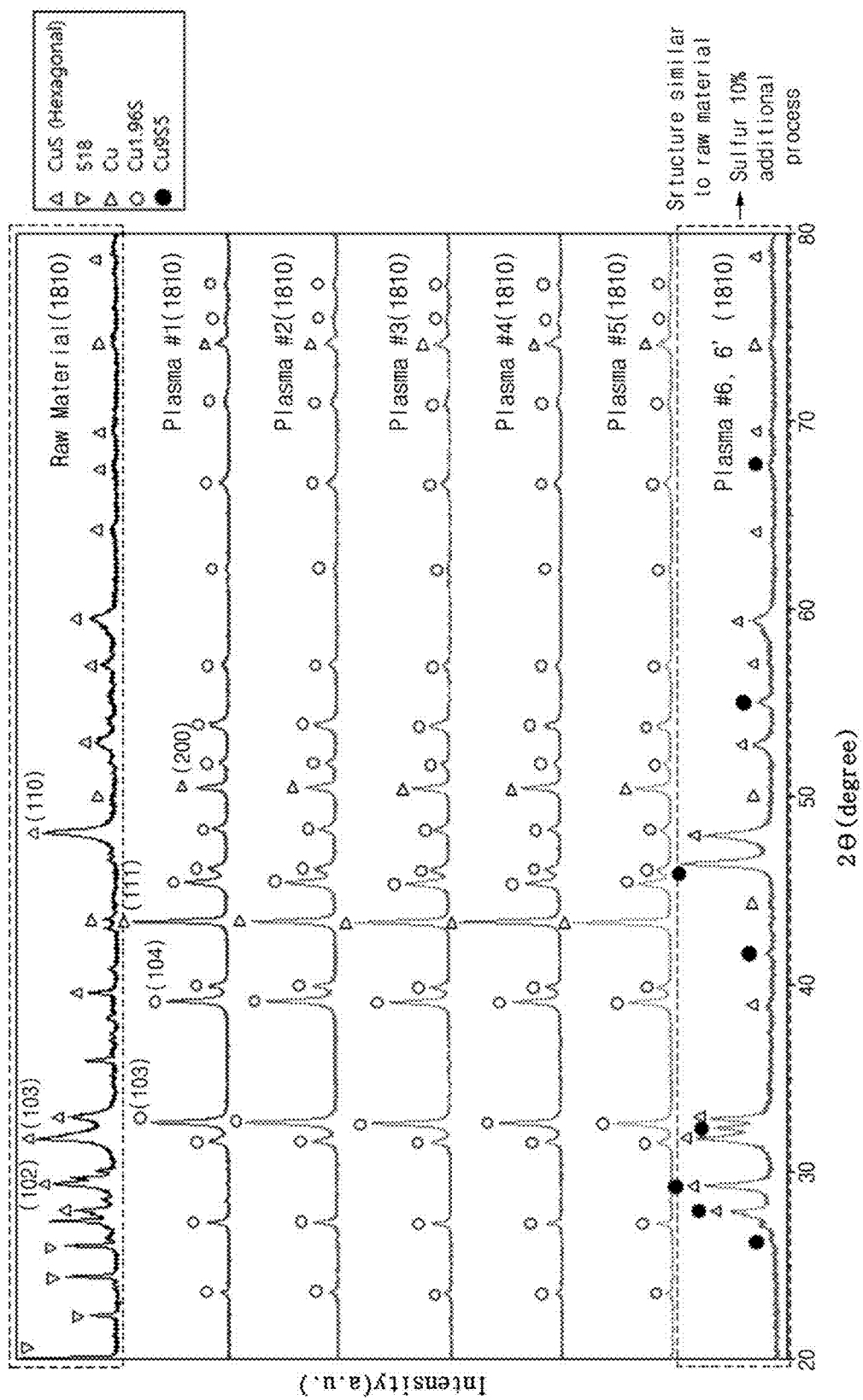
FIG. 9 shows a structure analysis result of CuO+S through XRD after plasma nano-sized process with respect to CuS.

Analysis of Structure of CuS Powder According to Thermal Plasma Nano-Sized Process Condition The structure of CuS disclosed in the above-mentioned comparative embodiments and embodiments was analyzed through XRD. FIG. 9 shows a structure evaluating result of CuS under the process condition of the experimental example 7 through XRD. In order to embody a structure similar to raw material through a conventional wet process of the comparative embodiment 3, the structure of a powder manufactured by a process condition was analyzed. As a result, the embodiments 6 (#6) and 7 (#6') in which sulfur of 10 weight % was added, comparing with other comparative embodiments, had similar peak as raw powder of the comparative embodiment 3 (See FIG. 9).

EXPERIMENTAL EXAMPLE 10

Figure 10:
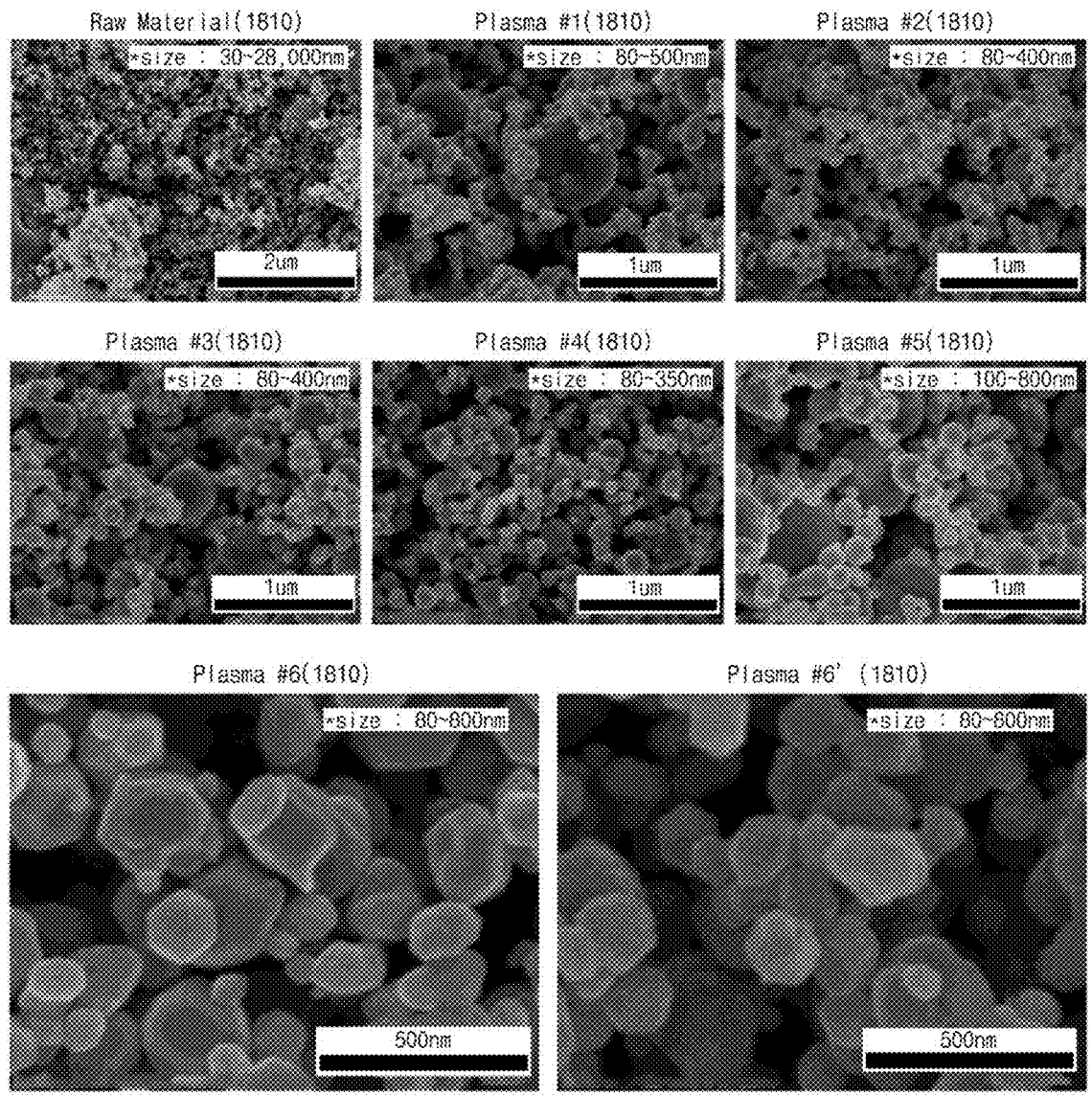
FIG. 10 shows an analysis result of morphology of CuS through SEM after plasma nano-sized process with respect to CuS.

Analysis of Morphology of CuS Powder According to Thermal Plasma Nano-Sized Process Condition The particle size, morphology, and component of CuS disclosed in the above-mentioned comparative embodiments and embodiments was analyzed through SEM. FIG. 10 is SEM data showing a morphology result according to a plasma condition. As a result, it was confirmed that the particle size of CuS in the comparative embodiments 4.3 (#1), 5.3 (#2), 6.3 (#2), 7.3 (#1), 8.3 (#5), and the embodiments 6 (#6) and 7 (#6') become decreased in comparison with Raw (CuO) of the comparative embodiment 3 to have uniform particle size hexagonal shape.

Accordingly, in case that a plasma process was applied to CuS, in comparison with a raw product through conventional wet process, a copper sulfide nano powder of a hexagonal shape having uniform particle size without impurities could be obtained.

EXPERIMENTAL EXAMPLE 11

Analysis of Particle Size and Content of CuS According to Additive Content of Sulfur It was confirmed that the copper sulfide nano powder through the plasma process condition of the embodiment 6 (#6) in which sulfur of 10 weight % was added to CuS through the thermal plasma had a similar structure and contents of Cu and S of the raw product through a conventional wet process, and impurities were removed. Under the same condition as the embodiment 6, when sulfur was added, and a plasma process was performed, the particle size and content of a generated compound was analyzed.

Embodiments 8 to 10

A CuS powder of the comparative embodiment 3 having a particle size ranged from 30 nm to 28,000 nm was injected to a thermal plasma apparatus through a raw material supply at an injection speed of 3 kg/hr, and sulfur S of 10 weight % with respect to CuS of 100 weight % was additionally injected at an injection speed of 0.3, 0.45, and 0.6 kg/hr. On condition that plasma power was ranged from 10 to 30 kW, a pressure was 150 Torr, and a gas flow rate was 100 LPM, copper sulfide nano powder was obtained through a thermal plasma process. The embodiment 8 was that the embodiment 6 was repeatedly performed.

TABLE 11

| Classification | Raw material amount (kg/hr) | | Power | Pressure | Total gas (Gas Flow Rate) |
|---|---|---|---|---|---|
| | CuO | S | (kW) | (Torr) | (LPM) |
| Embodiment 8 (#7) | 3 | 0.3 (10 W %) | 30 | 150 | 100 |
| Embodiment 9 (#8) | 3 | 0.45 (15 W %) | 30 | 150 | 100 |
| Embodiment 10 (#9) | 3 | 0.6 (20 W %) | 30 | 150 | 100 |

Figure 11:
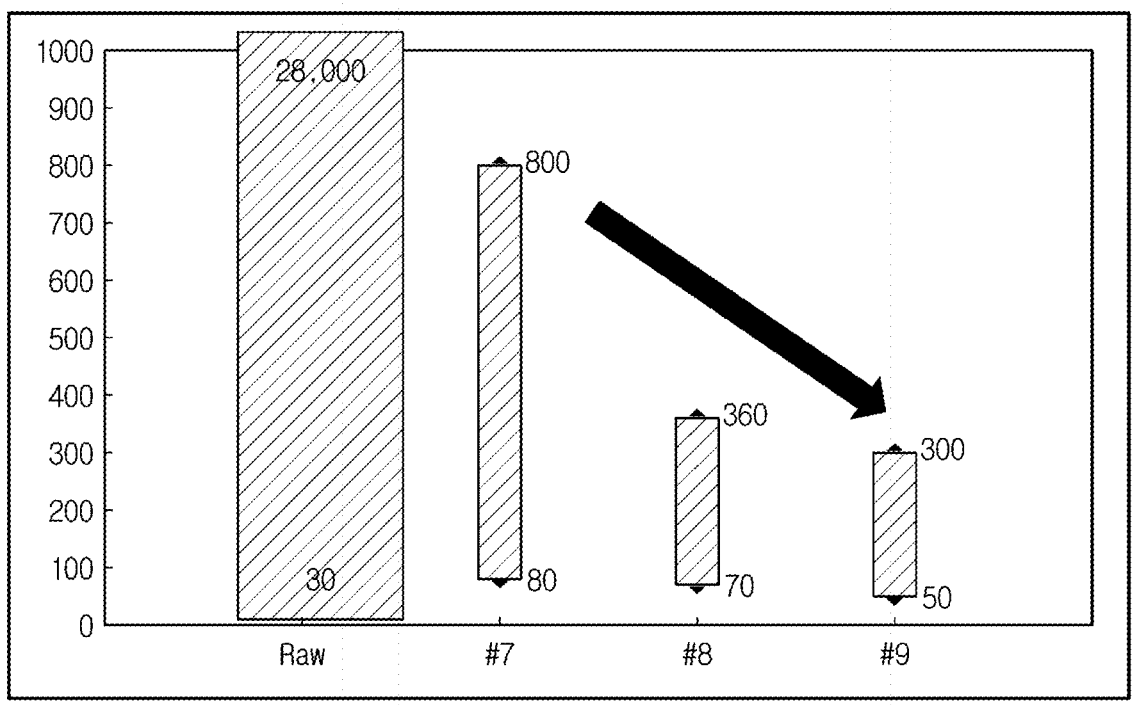
FIG. 11 shows an analysis result of size and content of CuS+S after plasma nano-sized process with respect to CuS+S.
Figure 11:
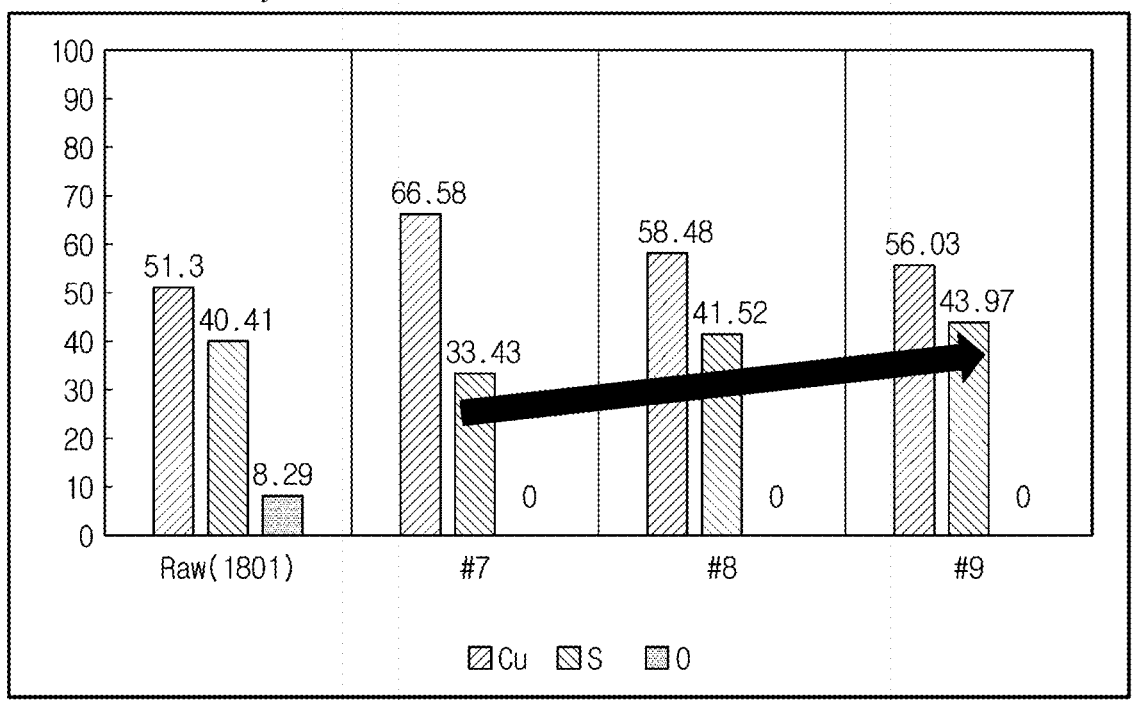

FIG. 11 shows an analysis result of a particle size and content of CuS in which sulfur was added according to a condition of table 10. Comparing CuS powder (Raw) having a particle size ranged from 30 nm to 28,000 nm of the comparative embodiment 3, as the content of sulfur S is increased, the particle size of CuS in which sulfur was added become small and the content of Cu and S thereof had similar to those of CuS (Raw). Concretely, when sulfur S of 10 weight %, 15 weight %, and 20 weight % with respect to 100 weight % of CuS were added respectively, the particle size of CuS were ranged from 80 nm to 800 nm, from 70 nm to 360 nm, and from 50 nm to 300 nm, respectively. Accordingly, there was a tendency that as sulfur was increased, the particle size of CuS was decreased and uniform. In addition, when sulfur of 10 weight % was added, the contents of Cu and S were 66.58 weight % and 33.43 weight %, respectively. When sulfur of 15 weight % was added, the contents of Cu and S were 58.48 weight % and 41.52 weight %, respectively. When sulfur of 20 weight % was added, the contents of Cu and S were 56.03 weight % and 43.97 weight %, respectively. In other words, it was confirmed that as sulfur was increased, the contents of Cu and S of copper sulfide nano powder and CuS powder (Raw) through a conventional wet process in the comparative embodiment 3 become similar.

Accordingly, in case that sulfur was added to CuS powder (Raw), and a thermal plasma process was performed to it, in comparison with CuS powder (Raw) without adding sulfur, the particle size of the obtained copper sulfide nano powder become more uniform, and the contents of Cu and S were more similar to CuS powder (Raw) before a thermal plasma process.

EXPERIMENTAL EXAMPLE 12

Structure Analysis of CuS+S After Plasma Nano-Sized Process with Respect to CuS+S (Through XRD)

Figure 12:
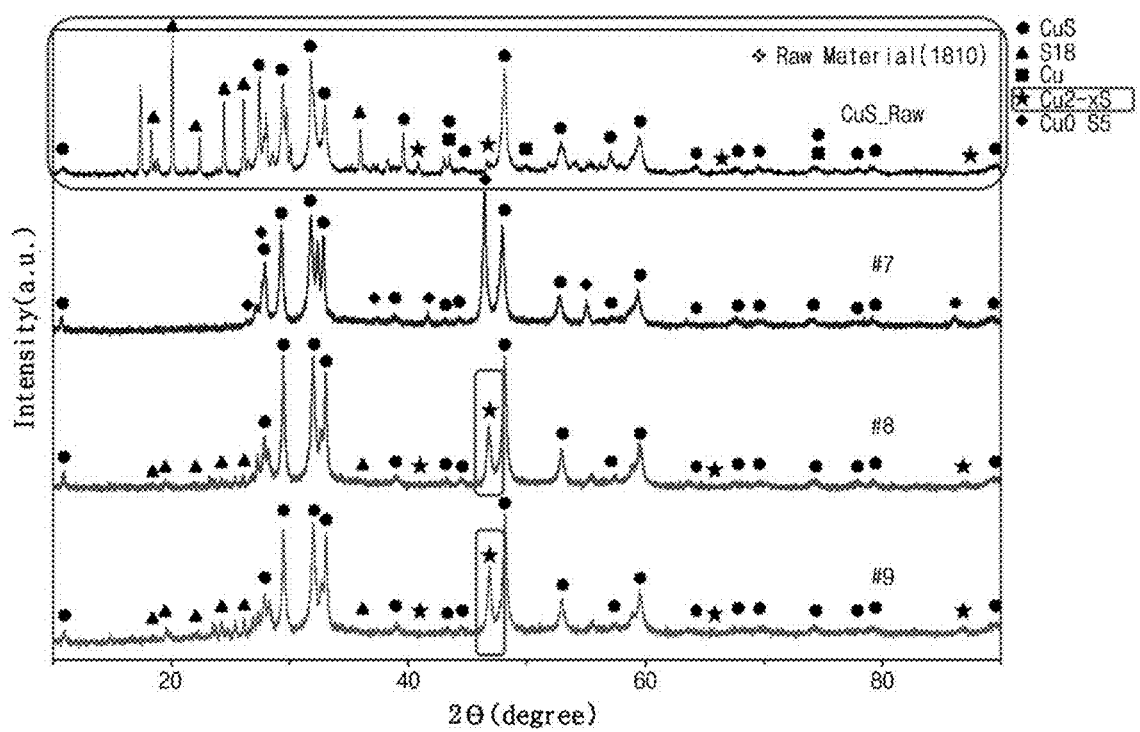
FIG. 12 shows a structure analysis result of CuS+S through XRD after plasma nano-sized process with respect to CuS+S.

After performing a plasma process with respect to CuS powder having a particle size ranged from 30 nm to 2,800 nm in the comparative embodiment 3 in which sulfur was added, the structure of a manufactured compound was analyzed through XRD. FIG. 12 shows a structure of a copper sulfide nano powder in the embodiments 8 to 10 according to a process condition of table 11. As a result, it was confirmed that CuS+S had a similar structure as CuS powder (Raw) through a conventional wet process in the comparative embodiment 3 as the content sulfur become increased.

EXPERIMENTAL EXAMPLE 13

Figure 13:
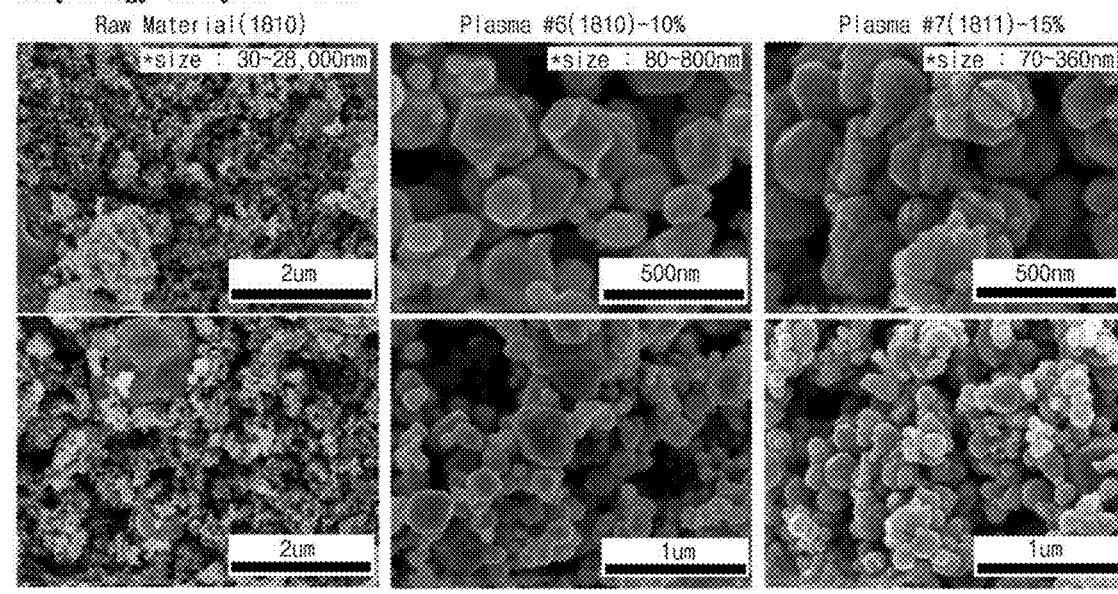
FIG. 13 shows an analysis result of morphology of CuS+S through SEM after plasma nano-sized process with respect to CuS+S.
Figure 13:
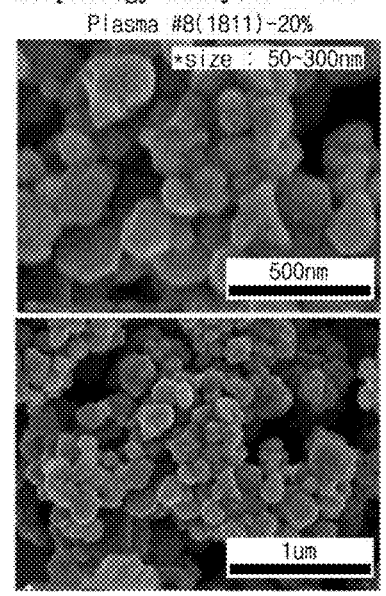

Morphology Analysis of CuS+S After Plasma Nano-Sized Process with Respect to CuS+S The above-mentioned embodiments were analyzed through SEM. FIG. 13 shows a morphology of a copper sulfide nano powder according to a process condition of table 11. As a result, as shown in FIG. 11, it was confirmed that as sulfur was increased, the particle size of the copper sulfide nano powder become small. In case that sulfur was added to CuS powder (Raw), and a thermal plasma process was performed to it, in comparison with CuS powder (Raw) through a conventional wet process, the particle size of the obtained copper sulfide nano powder of hexagonal shape become more uniform removing impurities. Concretely, when sulfur S of 10 weight %, 10 weight %, and 15 weight % with respect to 100 weight % of CuS were added respectively, the particle size of CuS were ranged from 70 nm to 360 nm. When sulfur of 20 weight % was added, the particle size of CuS was ranged from 50 nm to 300 nm.

EXPERIMENTAL EXAMPLE 14

Comparing Yield According to Plasma Nano-Sized Process with Respect to CuS+S

The generated amount and yield of copper sulfide nano powder obtained by applying CuS powder (see comparative embodiment 3) without adding sulfur having a particle size below a D90 standard 28 μm through a conventional wet process and a copper sulfide nano powder by adding sulfur were as following table 12. As a result, the amount and yield of the CuS powder where sulfur was added and the plasma process was performed was higher than those of the CuS powder without adding sulfur.

The amount of CuS powder (Raw) of the comparative embodiment 3 was Cu of 51.3 weight %, S of 40.41 weight %, and O of 8.29 weight %. If sulfur was not added, the amount of S of CuS (Raw) after the plasma process become decreased by more than 50%, and the amount of S of CuS (Raw) absorbed and grown at sidewalls of a reactor or an injection pipe become increased to bring a loss. In other words, the amount of the reassembling (nuclear growth) copper sulfide nano powder absorbed and grown at sidewalls of the reactor or the injection pipe was more than reaching a gathering member, thereby bringing a loss. In the meanwhile, if sulfur was added, the amount of the reassembling (nuclear growth) copper sulfide nano powder absorbed and grown at sidewalls of the reactor or the injection pipe become decreased, so that it can be easily moved to the gathering member. Accordingly, the reassembling copper sulfide nano power is prevented from being absorbed at sidewalls of the reactor or injection pipe to be capable of increasing the amount of generated CuS.

TABLE 12

| | Amount of CuS (kg/hr) | Amount of S (kg/hr) | Obtained amount of CuS | Yield of generated CuS comparing with amount Cu and S (%) |
|---|---|---|---|---|
| Com. embodiment 4.3 | 3 | 0 | Cu(80.12) S(19.17) O(0.71) | 9% |
| Com. embodiment 5.3 | 3 | 0 | Cu(80.96) S(18.58) O(0.46) | 11% |
| Com. embodiment 6.3 | 3 | 0 | Cu(81.76) S(18.24) | 13% |
| Com. embodiment 7.3 | 3 | 0 | Cu(82.48) S(17.53) | 15% |
| Com. embodiment 8.3 | 3 | 0 | Cu(81.98) S(18.02) | 12% |
| Embodiment 6 | 3 | 0.3 | Cu(66.58) S(33.43) | 20% |
| Embodiment 7 | 3 | 0.03 | Cu(65.03) S(34.97) | 22% |
| Embodiment 8 (same condition as Embodiment 6) | 3 | 0.3 | Cu(66.58) S(33.43) | 21% |
| Embodiment 9 | 3 | 0.45 | Cu(58.48) S(41.52) | 43% |
| Embodiment 10 | 3 | 0.6 | Cu(56.03) S(43.97) | 46% |

According to the present disclosure, a method for synthesizing copper sulfide nano powder using plasma synthesis is disclosed. The copper sulfide nano powder using the plasma synthesis according to the present disclosure is homogenized, and has high purity and uniform particles, and no impurities as compared with copper sulfide manufactured by a conventional wet process. In addition, there is an advantage that copper sulfide nano powder can be synthesized in high yield employing low-cost copper oxide compounds or copper sulfide compounds.

All such changes, modifications, variations and other uses and applications which do not depart from the spirit and scope of the invention are deemed to be covered by the invention which is limited only by the claims which follow.

What is claimed is:

1. A method for synthesizing a copper sulfide nano powder using plasma synthesis comprising:
   providing a copper compound to a plasma apparatus;
   adding a sulfur; and
   performing a plasma process with respect to the copper compound and the sulfur to synthesize a copper sulfide nano powder,
   wherein the plasma processing is performed on condition that a plasma power is ranged from 10 to 50 kW, a pressure is ranged from 130 to 500 Torr, or a gas flow rate is ranging from 80 to 200 LPM.

2. The method of claim 1, wherein the copper compound is a copper oxide compound or a copper sulfide compound.

3. The method of claim 1, wherein the copper compound is one or more selected from the group consisting of CuO, Cu2O, CuS, and CuS2.

4. The method of claim 1, wherein the copper compound has a particle size ranged from 30 nm to 53,000 nm.

5. The method of claim 1, wherein the sulfur of 5 weight % to 50 weight % is added with respect to the copper compound of 100 weight %.

6. The method of claim 1, wherein the copper compound is provided at an injection speed of 1 to 5 kg/hr.

7. The method of claim 1, wherein the sulfur is provided at a speed of 0.2 to 5 kg/hr.

8. The method of claim 2, wherein the copper oxide compound has a particle size ranged from 75 nm to 52,000 nm.

9. The method of claim 1, wherein the plasma processing is performed on condition that a plasma temperature is ranged from 5,000 to 10,000° C.

10. The method of claim 1, wherein the synthesized copper sulfide nano powder is hexagonal-shaped.

11. The method of claim 1, wherein the synthesized copper sulfide nano powder contains oxygen less than 5 weight %.

12. The method of claim 1, wherein the synthesized copper sulfide nano powder has a particle size ranged from 50 nm to 900 nm.

13. The method of claim 2, wherein, when the copper compound is the copper oxide compound, the plasma processing is performed on condition that the plasma power is ranged from 10 to 50 kW, the pressure is ranged from 150 to 500 Torr, or the gas flow rate is ranging from 100 to 200 LPM.

14. The method of claim 2, wherein, when the copper compound is the copper sulfide compound, the plasma processing is performed on condition that the plasma power is ranged from 20 to 40 kW, the pressure is ranged from 130 to 230 Torr, or the gas flow rate is ranging from 80 to 180 LPM.

* * * * *